INVENTOR.
HOLTON E. HARRIS

Nov. 7, 1967

H. E. HARRIS 3,351,280

TEMPERATURE PROGRAM APPARATUS

Filed July 7, 1965

INVENTOR.
HOLTON E. HARRIS

BY Brumbaugh, Free, Graves + Donohue his ATTORNEYS

United States Patent Office 3,351,280
Patented Nov. 7, 1967

3,351,280
TEMPERATURE PROGRAM APPARATUS
Holton E. Harris, Westport, Conn., assignor to Harrel Incorporated, East Norwalk, Conn., a corporation of Delaware
Filed July 7, 1965, Ser. No. 470,162
7 Claims. (Cl. 236—46)

ABSTRACT OF THE DISCLOSURE

An apparatus for programming the temperature of an oven over a range of selected temperatures. A number of parallel connected setting potentiometers are connected across a D-C voltage source and another tapped potentiometer with a movable contact has each of its taps connected to different adjustable contacts on the setting potentiometers. By suitably adjusting the setting potentiometers, and driving the movable contact of the tapped potentiometer, a signal representative of a desired temperature program may be obtained. Another signal generated by a temperature sensitive device in the oven is compared with the temperature program signal to obtain an output that maintains the oven at its programmed temperature.

---

This invention relates to apparatus for programming the temperature of an oven in a selected manner over a desired period of time.

It is frequently desirable to process materials or products through heating and cooling cycles. Programming these cycles has presented difficulties both in regard to accuracy and flexibility. Cams of varying contours have been used with some success, as have other mechanical devices, to control the oven temperature in accordance with a desired temperature program, but these units lack the flexibility, reliability and accuracy essential to temperature programming of certain materials and products.

The present invention overcomes the afore-mentioned difficulties and provides for programming the temperature of an oven in any desired manner between selected temperature extremes. To this end, a signal representative of a selected temperature program, preferably generated by a tapped potentiometer which has adjustable voltages inserted at its taps to provide at its movable contact a desired voltage function, and a signal representative of the oven temperature, are compared to obtain an output that will properly maintain the oven at its programmed temperature.

In a preferred embodiment of the invention, a set circuit indicates the magnitude of the voltage function to facilitate setting up of a desired temperature program. A read circuit may also be used to display directly the temperature in the oven at all times to facilitate the processing of materials and products.

These and further advantages of the invention will be more readily understood when the following description is read in connection with the accompanying drawings, in which.

Figure 1:
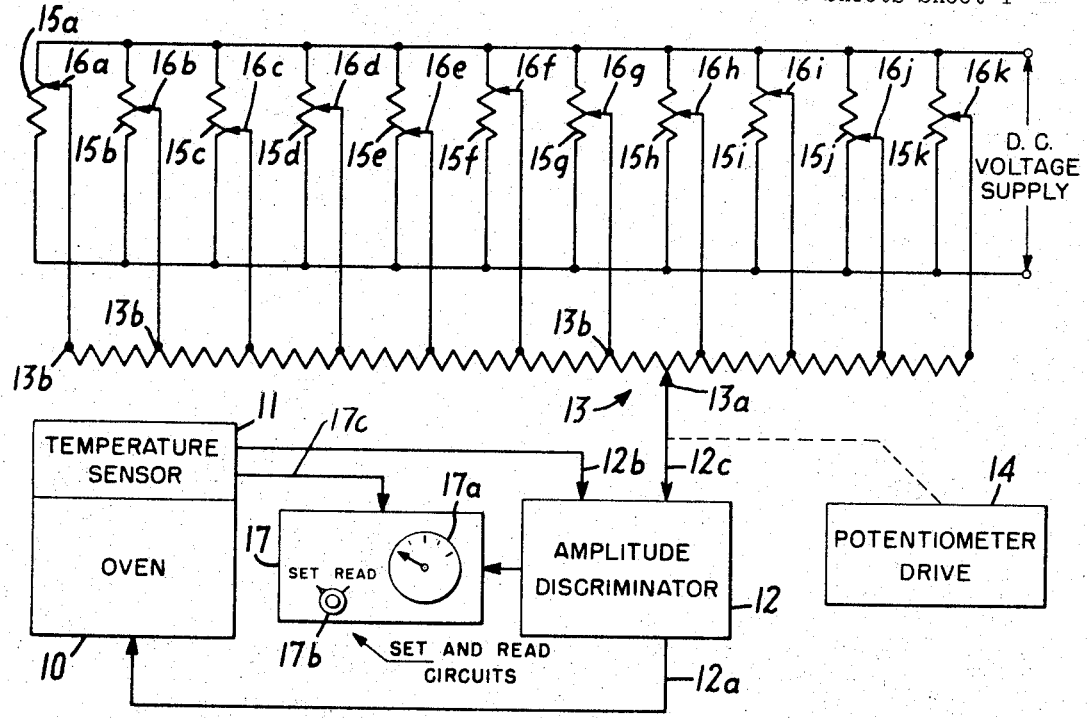
FIG. 1 is a schematic circuit diagram partially in block form showing an illustrative embodiment of the present invention.

Referring to a typical embodiment of the invention in greater detail with reference to FIG. 1, an electric oven 10 requiring programmed temperature control has an associated temperature sensor 11 to provide an output signal representative of the oven temperature. The temperature sensor 11 may comprise a bridge including a temperature sensitive element, for example, a thermistor, or the sensor may be a thermocouple or other suitable device that provides an output signal representative of temperature.

An amplitude discriminator 12 has its output 12a coupled to the oven 10 to control increases and decreases in its operating temperature. One input 12b of the amplitude discriminator 12 receives a signal from the temperature sensor 11 while another input 12c receives an analog voltage representative of the desired temperature in the oven 10 from a movable contact 13a of a tapped potentiometer 13 having a plurality of taps 13b. The amplitude discriminator 12 compares the analog voltage and temperature signal and provides an output signal that controls suitably the temperature of the oven 10. A magnetic amplifier of the type shown in FIG. 3 and described hereinafter may be used as the amplitude discriminator 12. Other suitable amplitude discriminators (also designated amplitude comparators) that compare voltages or currents may also be employed, for example, circuits of the type described in Waveforms, volume 19, Radiation Laboratory Series, pages 357–363.

A potentiometer drive 14, which may be a synchronous motor having provision for speed variation, drives the movable contact 13a along the potentiometer 13, which preferably incorporates a 360° tapped resistance element.

A plurality of setting potentiometers 15a–15k, connected in parallel across a voltage supply, preferably regulated and shown as a D-C supply although A-C may also be used, have slidable contacts 16a–16k connected to the taps 13b on the potentiometer 13.

Set and read circuits 17, which may be independent but advantageously are connected as described in detail hereinafter, are coupled to the temperature sensor 11 by conduit 17c and the comparator 12 to enable setting up of a temperature program with the assistance of an indicator 17a. Subsequently by actuating a switch control knob 17b, the temperature cycles comprising the program in the oven are displayed by the indicator 17a.

In operation, the set and read circuit 17 are placed in set operation. The movable contact 13a is then sequentially located at each tap 13b and the associated setting potentiometer 15a–15k adjusted to provide a voltage at the contact 13a representative of a desired temperature in the oven 10. By selecting setting potentiometers having a value small in comparison with the value of resistance between each pair of taps 13b on the linear potentiometer 13, in effect voltages are inserted into the potentiometer 13 at the taps 13b to provide a desired voltage function. In other words, the potentiometer taps tie the program to selected voltages at fixed intervals with linear interpolation between the taps when a linear potentiometer is used.

After setting up the temperature program by adjusting the setting potentiometers and calibrating the other components, the set and read circuits 17 are switched to read by the control 17b and the potentiometer drive 14 energized to initiate movement of the contact 13a along the potentiometer 13. Assuming that the contact 13a starts at the left end of the potentiometer, if the setting potentiometer movable tap 16a is set at a voltage to provide the upper limit temperature in the program, for example 1000°, in the oven 10, the signal received from the temperature sensor 11 will be compared with the voltage on the contact 13a in the amplitude discriminator 12, and if the signal shows the temperature to be below 1000°, an output from the amplitude discriminator 12 will cause the oven to be heated until the temperature sensor signal is of proper value at which time the oven will be at 1000°.

Assume next that the movable contact 13a has progressed to the tap 13b connected to the setting potentiometer 15b which has its tap 16b at a low voltage which represents the lower limit of the oven temperature in the program, for example 100°. The voltage on the movable contact 13a and the signal from the temperature sensor 11 will then be compared in the amplitude discriminator 12 and an output provided to the oven 10 to reduce, if necessary, the oven temperature to the desired value of 100°. Of course the voltage on the contact 13a has been decreasing as the contact moves from the first tap to the second tap, and the oven temperature has been following this program. Also during this time, the indicator 17a displays the exact oven temperature to enable the operator to follow the heating and cooling cycles.

Figure 2:
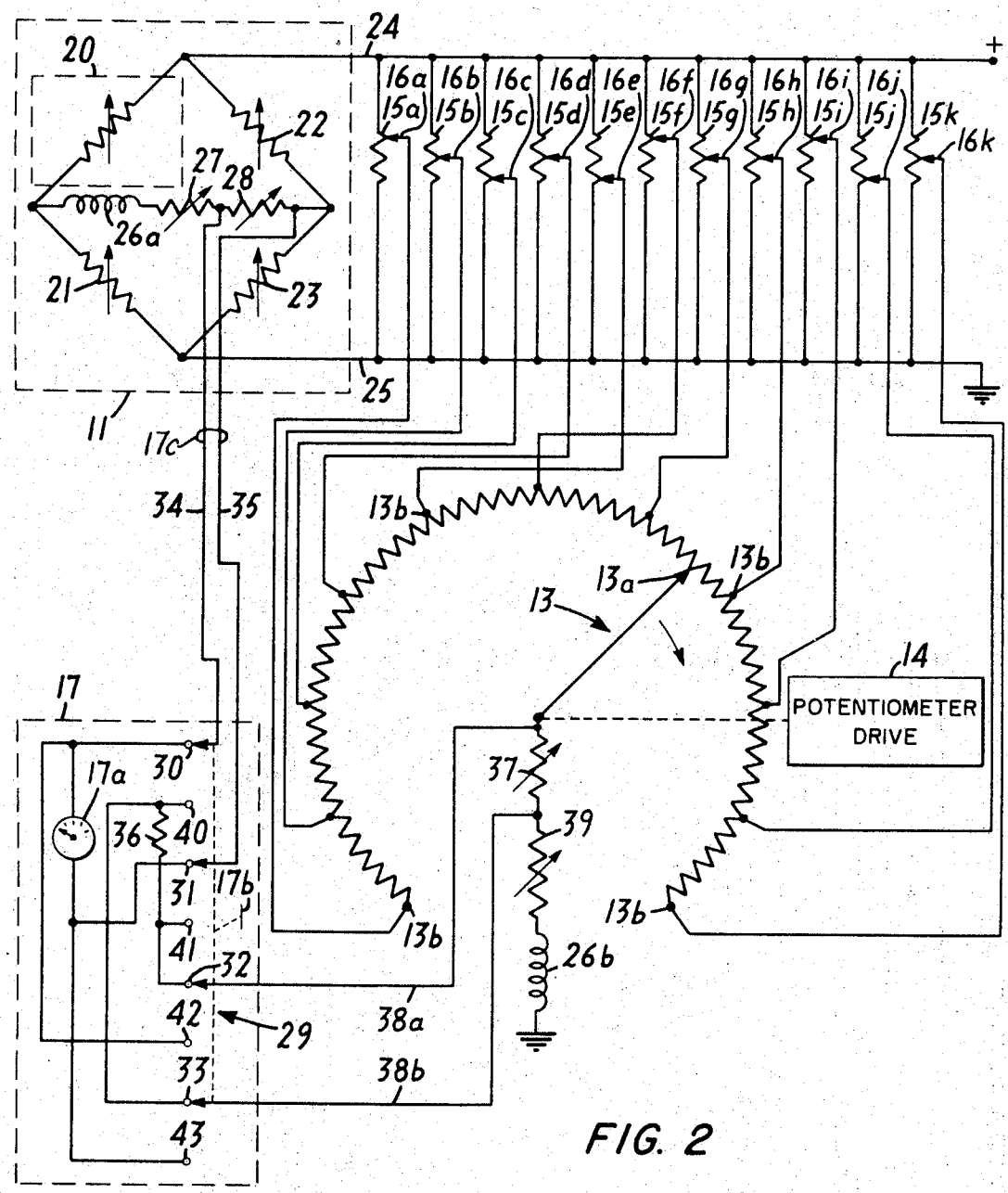
FIG. 2 is a schematic diagram illustrating exemplary circuits that may be used in the block diagram of FIG. 1.

Referring next in greater detail to exemplary circuits that may be used in the temperature programming system of FIG. 1, with particular reference to FIG. 2, the temperature sensor 11 comprises a bridge including in one arm a temperature responsive resistance 20, for example a thermistor, and variable resistors 21, 22 and 23 in the other arms enabling flexible adjustment of the bridge. Two opposite terminals of the bride are connected by conductors 24 and 25 across a D-C voltage supply, preferably regulated, and the other pair of opposite terminals of the bridge are connected in series with a control winding 26a of a magnetic amplifier 26, shown in FIG. 3, and a pair of adjustable resistors 27 and 28

Set and read circuits 17 comprise a four-pole double-throw switch 29 shown switched to read position by the knob 17b (FIG. 1) and connected to terminals 30, 31, 32 and 33. In read position, the indicator meter 17a is energized by being connected across terminals 30 and 31, in turn joined by conductors 34 and 35 to opposite sides of the resistor 28 in the temperature sensing bridge 11. A resistor 36, equal in value to the resistance of the indicator 17a, is connected across terminals 32 and 33 to appear to a resistor 37, coupled by conductors 38a and 38b to the terminals, the same electrically as the meter 17a.

When the switch 29 is moved by the control 17b to set position, its four poles contact terminals 40, 41, 42 and 43, and the indicator meter 17a is energized by being connected across terminals 42 and 43 in turn coupled by the conductors 38a and 38b across the resistor 37. At this time the resistor 35 parallels the resistor 28 to preclude disturbing the sensor circuit.

Connected in series with the movable contact 13a of the tapped potentiometer 13 and the resistor 37 is a further adjustable resistor 39 and a control winding 26b of the magnetic amplifier 26.

Figure 3:
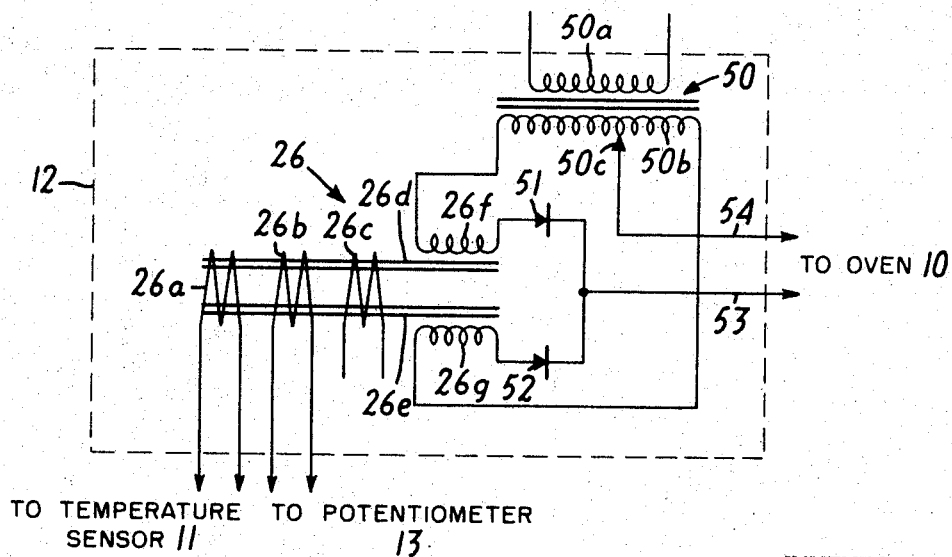
FIG. 3 is a further schematic circuit diagram that may be used in the apparatus shown in FIGS. 1 and 2.

Referring to the magnetic amplifier 26 with reference to FIG. 3, which may function as the amplitude discriminator 12 of FIG. 1, it includes the control windings 26a and 26b, shown in FIG. 2, and a bias winding 26c on a pair of cores 26d and 26e. Gate windings 26f and 26g are connected across a secondary winding 50b of a transformer 50 having a primary winding 50a coupled to a suitable source. Diodes 51 and 52, respectively, connected to the other sides of the gate winding 26f and 26g, are coupled to an output line 53, the other side of the output being connected through conductor 54 to a center tap 50c on the secondary of the transformer 50. The output conductors 53 and 54 are connected to the oven 10 for controlling its temperature.

The operation of the magnetic amplifier 26 is well known and need not be described in detail. It acts as an amplitude discriminator by comparing currents in the control windings 26a and 26b. Thus, if the current in one control winding becomes larger than that in the other, the output of the magnetic amplifier will vary in one direction, and if the current in the second winding becomes larger than that in the first winding, the output will vary in the other direction.

For oven control, the magnetic amplifier would normally be used so that the power to the oven is zero when the current in the two windings is equal. The output increases for larger currents in one winding than the other. If polarities are properly observed it is apparent that the oven temperature will always be held to a value such that the current in the two windings is nearly equal. For if they are not, there will be an output to the oven in such a direction as to drive them back toward equality. Further, it is apparent that by increasing the sensitivity of the magnetic amplifier 26 and the oven control circuits the difference between the current in one winding, representing the temperature in the oven, can be held as closely as desired to the current in the other winding, representing the desired temperature at that point in the program.

Initial calibration of the programmable temperature controller in FIG. 2 is accomplished as follows: Initially the switch 29 is moved to set position, and the sliding contact 13a is placed at one of the taps 13b along the potentiometer 13, preferably of the linear type, which has a 360° resistance element as diagrammatically shown. The setting potentiometer adjustable contact associated with the one tap 13b is now placed at zero voltage. This reduces the current in winding 26b to zero. At the lower temperature limit of the desired temperature span of the oven 10, for example 100°, the temperature sensor bridge 11 is balanced by adjustment of the bridge resistors until the output to the winding 26a is zero with the oven at 100°. The power output to the oven will now be zero, indicating that the desired temperature and actual temperature are equal. The indicator 17a is also adjusted so that it reads 100° under these zero voltage conditions.

Assuming for the purpose of explanation that 10 volts are impressed across the conductors 24 and 25, and that 10 volts corresponds to an upper temperature limit of 1000° in the oven 10, the setting potentiometer adjustable contact 13a associated with the one tap 13b mentioned above is now set at 10 volts. The output of the temperature sensing bridge is then set to a value corresponding to 1000°, either by actually putting the oven at 1000° or by simulating such conditions electrically. The resistors 27 and 39 are then adjusted so that the currents in the magnetic amplifier control windings 26a and 26b are equal as indicated by the output in the amplifier. Suitable adjustment of the resistor 37 gives a reading of 1000° on indicator 17a.

The switch 29 is then moved to read position and resistor 28 is adjusted to provide a reading of 1000° with the real or simulated sensor bridge output corresponding to 1000° oven temperature. The switch 29 is then moved back to set position. The other bridge components and oven power circuits are also adjusted at this time so that the entire circuit is properly calibrated to provide an oven temperature of 1000° with 10 volts at the movable contact 13a.

After calibration of the circuits in both set and read position as indicated above, any desired temperature program may be set into the device by moving the contact 13a along the potentiometer 13, preferably by hand, and the setting potentiometers 15a–15k are set to provide, as shown on the indicating meter 17a, a desired temperature program for the oven 10 having temperature limits controlled by the setting potentiometers and a cyclic rate and duration controlled by the speed at which the movable contact 13a is driven by the potentiometer 14.

When the selected temperature program has been set-up, the switch 29 is shifted by control 17b to read position to place the meter 17a in circuit with the temperature sensor output circuit to display the oven temperature during the programmed period. Note that at this time the resistor 35 is placed across the resistor 37 to prevent disturbance of the adjustments previously made. The potentiometer drive 14 is then actuated to provide the selected temperature program for a material or product in the oven 10.

It is apparent from the foregoing that the inventive apparatus selectively controls temperature programming of an oven in a flexible and accurate fashion. The ease of setting the temperature program and the variations in the program that may be produced provide significant advantages over the mechanical devices used in the past.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. Apparatus to program the temperature in an oven over a selected range of temperatures comprising a plurality of parallel connected setting potentiometers with adjustable contacts adapted to be connected across a D-C voltage source, a tapped potentiometer with a movable contact having taps connected to the adjustable contacts of the setting potentiometers, means driving the movable contact of the tapped potentiometer to provide at the movable contact a first signal representative of a selected temperature program, temperature sensitive means to generate a second signal representative of the oven temperature, and means responsive to the first and second signals to control the temperature of the oven.

2. Apparatus as defined in claim 1, wherein said responsive means comprises a magnetic amplifier having two control windings, one of said windings receiving the first signal and the other winding receiving the second signal.

3. Apparatus as defined in claim 1, which includes set means coupled to said movable contact to enable setting up the temperature program.

4. Apparatus as defined in claim 1, which includes read means coupled to said signal generating means to indicate the oven temperature during the program.

5. Apparatus to program the temperature in an oven over a selected range of temperatures comprising a plurality of parallel connected setting potentiometers with adjustable contacts adapted to be connected across a D-C voltage source, a tapped potentiometer with a movable contact having taps connected to the adjustable contacts of the setting potentiometer, means driving the movable contact of the tapped potentiometer to provide at the movable contact a first signal representative of a selected temperature program, temperature sensitive means to generate a second signal representative of the oven temperature, means responsive to the first and second signals to control the temperature of the oven, set and read means coupled to said movable contact and said temperature sensitive means, two position switching means associated with the set and read means, the set and read means providing indications representative of the first signal at the movable contact with the switching means in one position, the set and read means providing indications representative of the second signal from the temperature sensitive means with the switching means in the other position, thereby enabling setting of the temperature program and then reading of the oven temperature during the program.

6. Apparatus defined in claim 5, wherein said responsive means comprises a magnetic amplifier having two control windings, one of said windings receiving the first signal and the other winding receiving the second signal.

7. In a control system, a plurality of parallel connected setting potentiometers with adjustable contacts adapted to be connected across a voltage source, a tapped potentiometer with a movable contact having taps connected to the adjustable contacts of the setting potentiometers, means driving the movable contact of the tapped potentiometer, whereby a selected voltage function varying between limits determined by the voltage source may be generated at the movable contact of the tapped potentiometer.

References Cited

UNITED STATES PATENTS

| | | | |
|---|---|---|---|
| 2,491,606 | 12/1949 | Dickey | 236—46 |
| 2,495,844 | 1/1950 | Hornfeck | 236—46 |
| 2,496,860 | 2/1950 | Davis | 219—503 |
| 2,547,750 | 4/1951 | Hall | 236—46 |
| 2,593,562 | 4/1952 | Hornfeck | 236—46 |
| 2,608,635 | 8/1952 | Mershon | 219—499 |
| 2,738,504 | 3/1956 | Gray | 323—79 |
| 2,760,146 | 8/1956 | Wilentchik | 323—79 |
| 2,779,909 | 1/1957 | Short | 323—79 |
| 3,043,517 | 7/1962 | Hanna | 236—46 |
| 3,240,428 | 3/1966 | Vinrath | 219—492 |

WILLIAM J. WYE, *Primary Examiner.*